United States Patent
Goldberg et al.

(10) Patent No.: US 6,483,896 B1
(45) Date of Patent: Nov. 19, 2002

(54) SPEECH RECOGNITION USING TELEPHONE CALL PARAMETERS

(75) Inventors: Randy G. Goldberg, Princeton, NJ (US); Kenneth H. Rosen, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/019,357

(22) Filed: Feb. 5, 1998

(51) Int. Cl.[7] .......................... H04M 1/64; G10L 15/00
(52) U.S. Cl. ............... 379/88.01; 379/88.02; 704/231; 704/246; 704/255
(58) Field of Search ............... 379/258, 142, 379/213, 88.01–88.06, 88.1, 88.19, 88.2, 88.21, 88.25; 704/231, 240, 243, 246, 251, 270.1, 255

(56) References Cited

U.S. PATENT DOCUMENTS

| | | | |
|---|---|---|---|
| 5,241,619 A | * 8/1993 | Schwartz et al. | 395/2 |
| 5,524,169 A | 6/1996 | Cohen et al. | 395/2.4 |
| 5,638,425 A | * 6/1997 | Meador, III et al. | 379/88 |
| 5,644,680 A | * 7/1997 | Bielby et al. | 395/2.49 |
| 5,748,840 A | * 5/1998 | La Rue | 395/2.63 |
| 5,867,562 A | * 2/1999 | Scherer | 379/88 |
| 5,960,063 A | * 9/1999 | Kuroiwa et al. | 379/88.01 |
| 5,995,929 A | * 11/1999 | Gupta | 704/251 |
| 6,122,361 A | * 9/2000 | Gupta | 379/223 |

* cited by examiner

*Primary Examiner*—Fan Tsang
*Assistant Examiner*—Ovidio Escalante
(74) *Attorney, Agent, or Firm*—Kenyon & Kenyon

(57) ABSTRACT

A speech recognition system recognizes a telephone call parameter dependent word received during a telephone call. The recognition system extracts a telephone call parameter (e.g., the telephone number from where the telephone call originated, the time of day, etc.) from the telephone call and generates a probable word set from the telephone call parameter. The probable word set includes at least one telephone call parameter dependent word. Further, the recognition system receives a speech signal and generates one or more of word choices from the speech signal. The recognition system then selects, based on the probable word set, one of the generated word choices as the recognized telephone call parameter dependent word.

20 Claims, 2 Drawing Sheets

SPEECH RECOGNITION USING TELEPHONE CALL PARAMETERS

FIELD OF THE INVENTION

The present invention is directed to a speech recognition system. More particularly, the present invention is directed to a speech recognition system that uses telephone call parameters to increase its accuracy.

BACKGROUND OF THE INVENTION

Speech recognition systems are increasingly being used to translate human spoken words or utterances directly into their written equivalent and meaning. Speech recognition systems can avoid the need for these spoken words to be manually entered into a computer, or to be recognized by a human. Therefore, speech recognition systems are desirable for many businesses because they allow employees to perform other tasks.

However, speech recognition systems can provide inaccurate results. An exact correspondence between a spoken word and a recognized word is difficult to attain due to, for example, the deterioration of speech signals that routinely occurs over conventional telephone lines and the different ways the same words are pronounced by different users. In order to compensate for inaccuracies, many speech recognition systems used by businesses must request that a user pronounce the word multiple times, or be subject to various confirmation routines. This can be time consuming and frustrating to the user.

Based on the foregoing, there is a need for a speech recognition system that has an increased recognition accuracy compared to known speech recognition systems without requiring additional input from the user.

SUMMARY OF THE INVENTION

One embodiment of the present invention is a speech recognition system for recognizing a telephone call parameter dependent word received during a telephone call. The recognition system extracts a telephone call parameter (e.g., the telephone number from where the telephone call originated, the time of day, etc.) from the telephone call and generates a probable word set from the telephone call parameter. The probable word set includes at least one telephone call parameter dependent word. Further, the recognition system receives a speech signal and generates one or more word choices from the speech signal. The recognition system then selects, based on the probable word set, one of the generated word choices as the recognized telephone call parameter dependent word.

By using a telephone call parameter to recognize a received speech signal, the recognition accuracy in the present invention is improved without requiring any additional user input.

DETAILED DESCRIPTION

Figure 1:
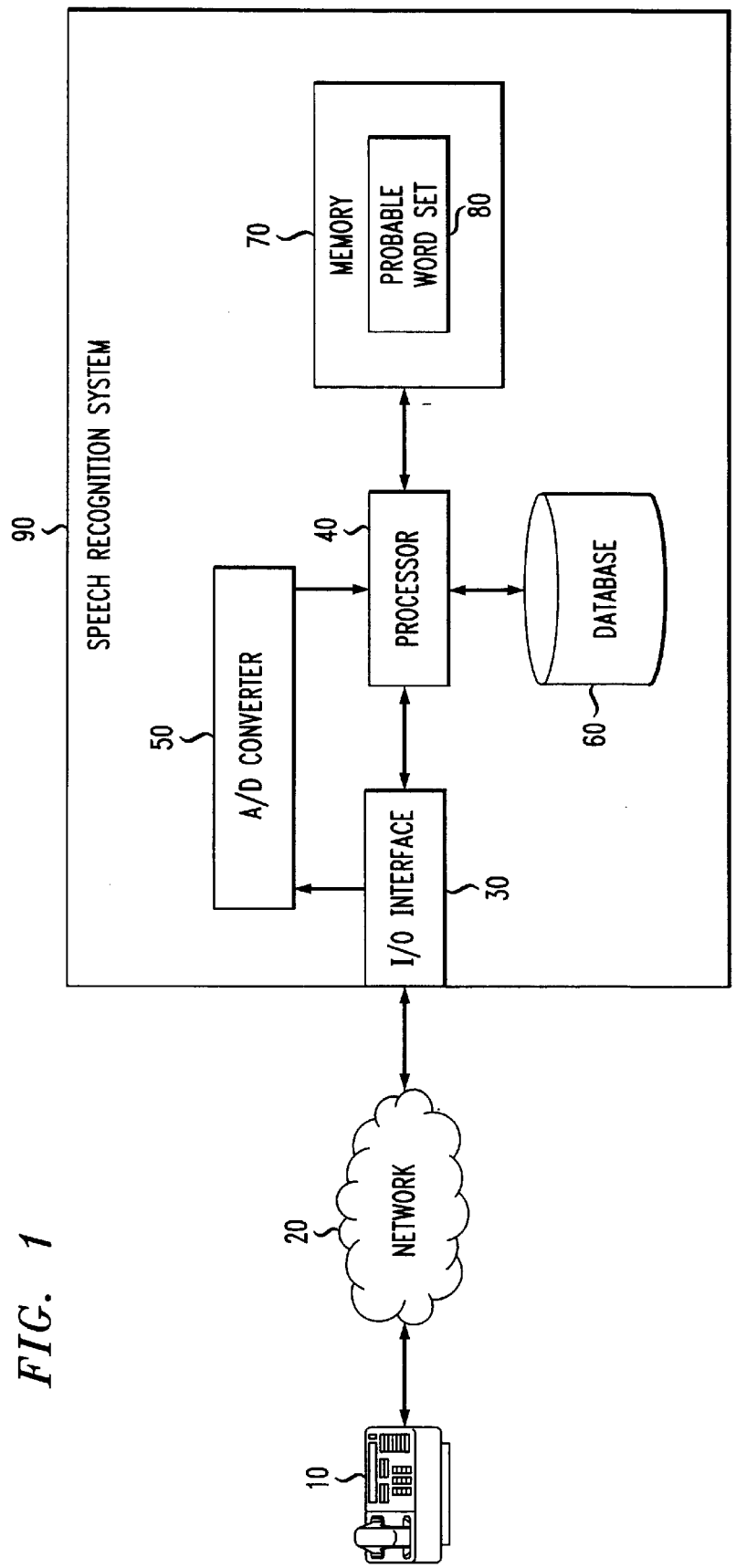
FIG. 1 is a block diagram illustrating a speech recognition system in accordance with one embodiment of the present invention.

One embodiment of the present invention is a speech recognition system that uses parameters obtained from a telephone call to enhance its recognition accuracy. FIG. 1 is a block diagram illustrating a speech recognition system 90 in accordance with one embodiment of the present invention.

Speech recognition system 90 includes an I/O interface 30. I/O interface 30 interfaces system 90 to a user. In the embodiment shown in FIG. 1, I/O interface 30 is coupled through a network 20 to a telephone 10. Telephone 10 enables a user of system 90 to access system 90 by participating in a telephone call between telephone 10 and system 90. The user can transmit a speech signal to system 90 through telephone 10 as well as receive signals from system 90. Network 20 can be any network that enables the user at telephone 10 to dial a telephone number associated with system 90. For example, network 20 can be the Public Switched Telephone Network ("PSTN"), a local area network, the Internet, or an intranet.

Speech recognition system 90 further includes a processor 40 and an analog-to-digital ("A/D") converter 50 coupled to I/O interface 30. Processor 40 is programmed to execute the steps of the invention that are described in detail in conjunction with FIG. 2. A/D converter 50 converts analog speech signals received from I/O interface 30 into digital signals that are received by processor 40. Processor 40 is coupled to a database 60 and a memory device 70.

One or more parameters can be extracted by processor 40 from a telephone call to speech recognition system 90 that is initiated by a user at telephone 10. These extracted parameters are inherent in the telephone call itself, and do not require additional input from a user of system 90, or prior knowledge of the user by system 90. These parameters are referred to for the purposes of this patent as "telephone call parameters."

One example of a telephone call parameter is the telephone number that the call to speech recognition system 90 is initiated from (i.e., the telephone number associated with telephone 10). In one embodiment, the telephone number can be extracted by processor 40 using an automatic number identification ("ANI") received by speech recognition system 90. An approximate geographic location of where the telephone call was initiated from can be determined from the area code of the extracted telephone number (e.g., if the area code is "732", the call has originated from the central New Jersey area).

Another example of a telephone call parameter is the date and time of day that the telephone call is initiated. Processor 40 can extract this parameter using an internal calendar and time of day clock.

Another example of a telephone call parameter is whether the telephone call is a fixed location telephone call or a mobile location telephone call. In one embodiment, a telephone call can be determined to be a mobile location telephone call based on information received from a cellular tower.

Many words that are spoken by a user at telephone 10 and must be recognized by speech recognition system 90 have a high probability of being dependent on one or more of the extracted telephone call parameters. For the purposes of this patent, these words are referred to as "telephone call parameter dependent" words.

For example, in one embodiment speech recognition system 90 is implemented in an airline reservation and information system. One word that must be recognized by speech recognition system 90 in this embodiment is the airport from which the user will be departing. More than likely, the departure airport is dependent to the geographic location that the call is initiated from. For example, the departure airport may be within a 50-mile radius of where the call is initiated from, depending on the geographic location of the caller. Therefore, in this embodiment, the departure airport received from the user is a telephone call parameter dependent word that is dependent on the originating telephone number extracted by speech recognition system 90 from the telephone call. In this example, the extracted originating telephone number is the telephone call parameter.

As a further example, in the airline reservation system another telephone call dependent word is the date of departure when a user is purchasing an airline ticket. Most often a date of departure occurs within a fixed number of days after a reservation call (e.g., within 45 days after the call). Therefore, the date of departure is a telephone call parameter dependent word that is dependent on the date that the telephone call to the speech recognition system 90 is initiated. In this example, the extracted date of the telephone call is the telephone call parameter.

Another example of information from the airline reservation/information system is the expected time of arrival of a flight. Most time of arrival flight queries by a user that can be considered a telephone call dependent parameter likely concern flights that are scheduled to arrive within two hours of the telephone call. Therefore, the time of arrival and the flight number are telephone call dependent parameters that are dependent on the time that the telephone call to speech recognition system 90 is initiated. In this example, the extracted time of the telephone call is the telephone call parameter of interest.

Database 60 stores a plurality of telephone call parameter dependent words and a plurality of telephone call parameters. Each telephone call parameter is indexed to one or more telephone call parameter dependent words. For example, in one embodiment telephone number area codes are indexed to major airports within a 50-mile radius of the geographic location of the area code. Therefore, the area code of "732", which corresponds to central New Jersey, is indexed to the Philadelphia Airport, the Newark Airport, John F. Kennedy Airport in New York and LaGuardia Airport in New York.

When database 60 is queried based on a telephone call parameter, the telephone call parameter dependent words that are indexed to the telephone call parameter are retrieved. Therefore, in the previously described example, a query of database 60 based on the telephone call parameter of "732" will retrieve the airport names of the Philadelphia Airport, the Newark Airport, John F. Kennedy Airport in New York and LaGuardia Airport in New York.

The telephone call parameter dependent words retrieved from database 60 form a "probable word set" and are stored in memory 70 of FIG. 1. The probable word set 80 is then used by speech recognition system 90 to enhance the recognition of telephone call parameter dependent words that are received from the user.

A probable word set 80 can also be formed dynamically by processor 40 without requiring a query of database 60. For example, if the telephone call parameter is the date that the call is initiated, processor 60 can determine all dates (i.e., telephone call dependent words) that occur within the next three months. These dates form probable word set 80 that is then stored in memory 70 and is used to enhance the speech recognition of a telephone call dependent word.

Figure 2:
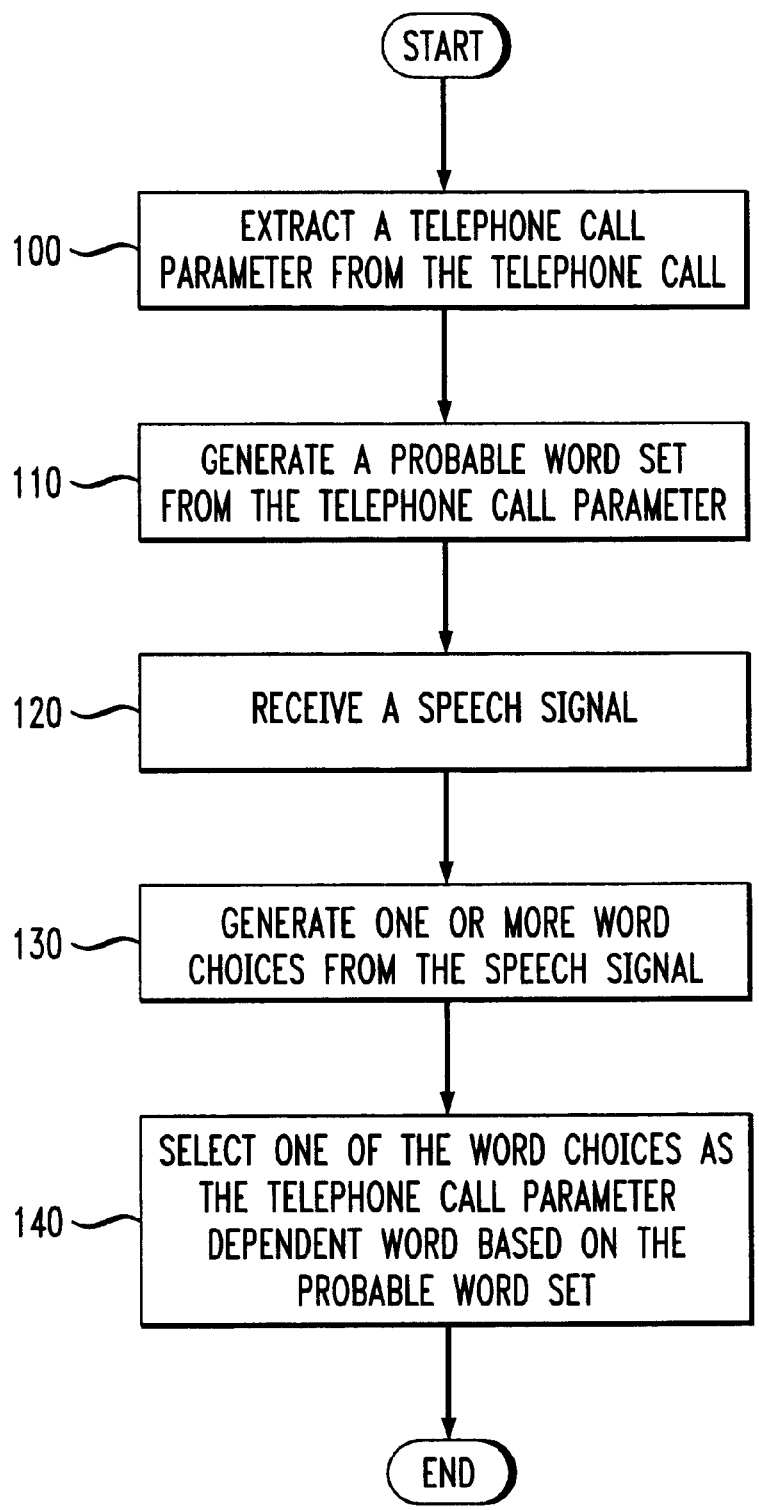
FIG. 2 is a flowchart illustrating some of the steps performed by one embodiment of the speech recognition system when recognizing a telephone call parameter dependent word during a telephone call.

FIG. 2 is a flowchart illustrating some of the steps perforated by one embodiment of speech recognition system 90 when recognizing a telephone call parameter dependent word during a telephone call. In one embodiment, the steps are executed by processor 40 and stored as software in memory device 70. In other embodiments, the functions of the steps are performed using hardware, or a combination of hardware or software.

At step 100, a telephone call parameter is extracted from the telephone call. For example, in the airline reservation system embodiment, the telephone number that the call is originating from is extracted using ANI by processor 40 which receives the ANI during the telephone call.

At step 110, a probable word set is generated from the extracted telephone call parameter. In one embodiment, this step includes the step of querying database 60 to retrieve one or more telephone call dependent words. The retrieved words form the probable word set. In the airline reservation system embodiment, for example, if the extracted telephone call parameter is a telephone number having the area code of "732", the query may retrieve the Philadelphia Airport, the Newark Airport, John F. Kennedy Airport in New York and LaGuardia Airport in New York. These four airports form the probable word set. In another embodiment, the probable word set is generated dynamically without querying database 60.

At step 120, a speech signal is received from the user after the telephone parameter dependent word is requested. The request can be in the form of a computer generated or recorded voice sent to the user at telephone 10. For example, in the airline reservation embodiment, the request could be "What airport are you departing from?" The speech signal is generated by the user's utterance in response to the request.

At step 130, at least one word choice is generated from the received speech signal. In one embodiment, processor 40 utilizes a Hidden Markov Model to generate one word choice or to generate a list of "N-best" choices. A probability for each word choice that that word choice is the correct word choice can also be generated. An example of using a Hidden Markov Model is disclosed in U.S. Pat. No. 5,241,619, the entire disclosure of which is herein incorporated by reference. In another embodiment, processor 40 generates one word choice, and then optionally executes post-processing routines to generate multiple choices and associated probabilities for each choice. One example of such post-processing routines is disclosed in U.S. patent application Ser. No. 08/763,382, filed on Dec. 13, 1996 and entitled "Statistical Database Correction of Alphanumeric Account Numbers for Speech Recognition and Touch-Tone Recognition", the entire disclosure of which is herein incorporated by reference. Further, other known methods can be used by processor 40 to generate one word choice or multiple word choices from the received speech signal.

At step 140, one of the word choices generated at step 130 is selected as the telephone call parameter dependent word based on the probable word set. The probable word set can be used in a variety of ways to improve the chances that the selected word choice is the correct word choice.

In one embodiment, processor 40 determines if any of the word choices match one of the words in probable word set 80. If there is a match, the matched word choice is selected as the telephone call parameter dependent word. If there is not a match, in one embodiment none of the word choices are selected as the telephone call parameter dependent word and the user may be asked to repeat the word. In another embodiment one of the unmatched word choices is selected using standard selection methods (e.g., selecting the word choice with the highest probability). Therefore, in the airline reservation system, if one of the word choices generated at step 130 matches either the Philadelphia Airport, the Newark Airport, John F. Kennedy Airport in New York or LaGuardia Airport in New York, that word choice is selected as the telephone call parameter dependent word.

This use of probable word set 80 is especially helpful in the frequently occurring situation of selecting between two or more word choices that rhyme. For example, if two word choices are Austin and Boston, Boston would be selected as the telephone call parameter dependent word if Boston was included in probable word set 80 and Austin was not. In one embodiment, probable word set 80 is only used when two or more word choices rhyme. Otherwise, one of the word choices is selected using standard selection methods. One example of a standard selection method for rhyming words is having the system ask the user to "Press 1 if Boston is the correct destination or press 2 if Austin is the correct destination."

In another embodiment, multiple word choices are generated and a probability is assigned to each word choice. The multiple word choices are compared to probable word set 80 and the probabilities are then modified based on whether each word choice matches a word found in probable word set 80. For example, for each word choice that is a match to a word found in probable word set 80, the probability associated with that word is tripled. One of the word choices is then selected using known methods of selecting the word choice with the highest probability.

Once a word choice is selected at step 140, known methods can be used to confirm that the selected word choice is the correct word choice. For example, using a computer generated voice, processor 40 can ask the user "Is the departure airport John F. Kennedy Airport? Say Yes or No." The response from the user will confirm if the selected word choice was correct.

As disclosed, the present invention utilizes parameters extracted from a telephone call that do not require additional user input to increase the recognition accuracy of telephone call parameter dependent words. This allows speech recognition to proceed more quickly and with less disruption to the user.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for recognizing a first telephone call parameter dependent word received during a telephone call, said method comprising the steps of:
   (a) receiving a speech signal;
   (b) generating one or more word choice from the speech signal; and
   (c) if two or more of said generated word choices are determined to rhyme, recognizing the received word by:
      determining a telephone call parameter, wherein said telephone call parameter is information relating to whether the telephone call is a fixed location telephone call or a mobile location telephone call;
      generating a probable word set from the telephone call parameter, wherein said probable word set comprises at least one telephone call parameter dependent word; and
      selecting one of the generated word choices as the first telephone call parameter dependent word, wherein said selecting step is based on the probable word set.

2. The method of claim 1, wherein said selecting step comprises the steps of:
   determining a match between said one or more word choices and said probable word set; and
   selecting the match as the first telephone call parameter dependent word.

3. The method of claim 1, further comprising the step of:
   assigning probabilities to said word choices;
   wherein said selecting step comprises the steps of: comparing said word choices with said probable word set; and
   modifying the probabilities based on the comparison.

4. The method of claim 1, wherein step (b) utilizes a Hidden Markov Model.

5. The method of claim 1, wherein generating a probable word set is also based the date and time of day of the telephone call.

6. A method for improving the accuracy of a speech recognition system that recognizes a received speech signal during a telephone call, wherein said speech signal represents a telephone call parameter dependent word, said method comprising the steps of:
   (a) extracting a telephone call parameter from the telephone call, wherein said telephone call parameter is information relating to the date and time of day that the telephone call is initiated;
   (b) generating a probable word set from the telephone call parameter, wherein said probable word set comprises at least one second telephone call parameter dependent word;
   (c) generating one or more word choices from the speech signal; and
   (d) selecting one of the generated word choices as the first telephone call parameter dependent word, wherein said selecting step is based on the probable word set.

7. The method of claim 6, wherein step (b) comprises the steps of:
   (b-1) querying a database based on the telephone call parameter, the database having stored thereon a plurality of third telephone call parameter dependent words indexed to a plurality of second telephone call parameters; and
   (b-2) retrieving the at least one second telephone call parameter dependent word from the database.

8. The method of claim 6, wherein step (d) comprises the steps of:
   (d-1) determining a match between said one or more word choices and said probable word set; and
   (d-2) selecting the match as the first telephone call parameter dependent word.

9. The method of claim 6, wherein step (d) comprise:, the steps of:
   (d-1) determining whether any of the word choices rhyme; and
   (d-2) determining whether any of the word choices that rhyme has a match in the probable word set.

10. The method of claim 6, further comprising the step of:
    assigning probabilities to said word choices;
    wherein step (d) comprises the steps of:
       (d-1) comparing said word choices with said probable word set; and
       (d-2) modifying the probabilities based on the comparison.

11. The method of claim 6, wherein step (c) utilizes a Hidden Markov Model.

12. The method of claim 6, wherein step (c) comprises the step of executing a post-processing routine.

13. A method for recognizing a word received during a telephone call, said method comprising the steps of:
  (a) receiving a speech signal representing a received word;
  (b) generating one or more word choices from the speech signal;
  (c) determining whether any two or more of said generated word choices rhyme; and
  (d) if two or more of said generated word choices where determined to rhyme, recognizing the received word by:
    determining a telephone call parameter;
    generating a probable word set from the telephone call parameter, wherein said probable word set comprises at least one telephone call parameter dependent word;
    selecting one of the generated word choices as the received word, wherein said selecting step is based on the probable word set.

14. The method of claim 13, wherein said generating a probable word set comprises the steps of:
  querying a database based on the telephone call parameter; and
  retrieving the at least one telephone call parameter dependent word from the database.

15. The method of claim 13, wherein said selecting comprises the steps of:
  determining a match between said one or more word choices and said probable word set; and
  selecting the match as the received word.

16. The method of claim 13, further comprising the step of:
  assigning probabilities to said word choices;
  wherein said selecting comprises the steps of:
    comparing said word choices with said probable word set; and
    modifying the probabilities based on the comparison.

17. The method of claim 13, wherein said generating a probable word set utilizes a Hidden Markov Model.

18. The method of claim 13, wherein the telephone call parameter is an originating telephone number of the telephone call.

19. The method of claim 13, wherein the telephone call parameter is a time of day of the telephone call.

20. The method of claim 13, wherein the telephone call parameter is information relating to whether the telephone call is a fixed location telephone call or a mobile location telephone call.

* * * * *